Oct. 11, 1949.  G. A. DAY ET AL  2,484,402
PROCESS FOR PRODUCING CHLORINE DIOXIDE
Filed Jan. 4, 1946
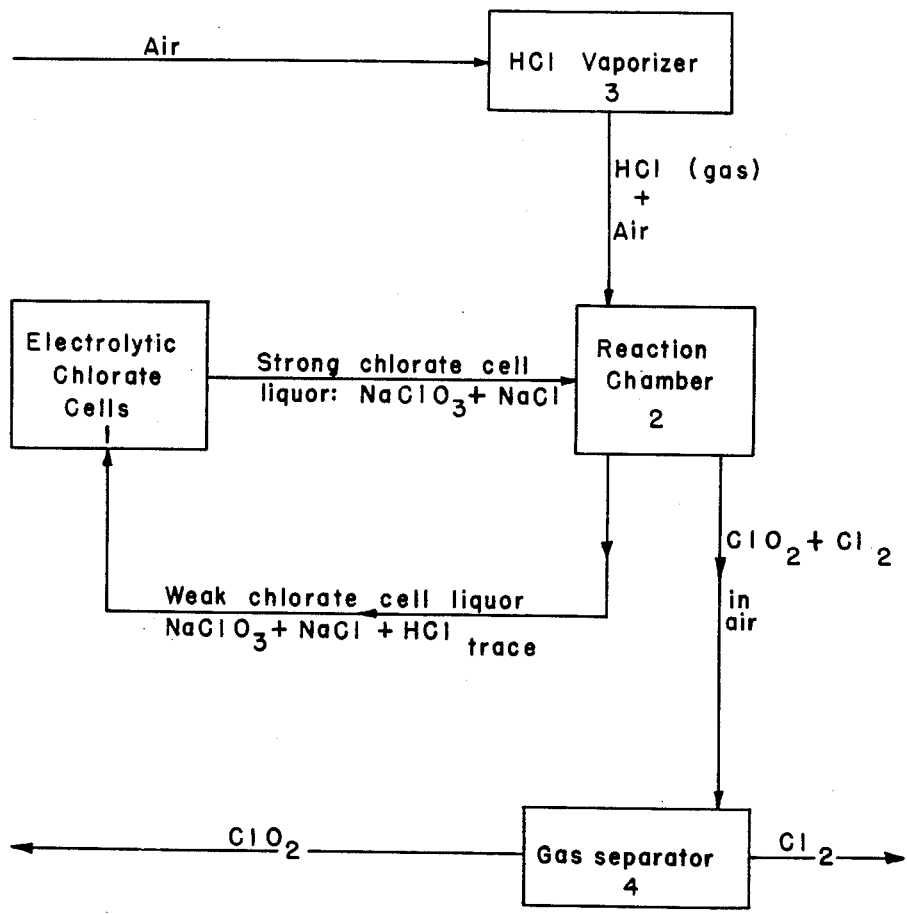

Patented Oct. 11, 1949

2,484,402

UNITED STATES PATENT OFFICE 2,484,402

PROCESS FOR PRODUCING CHLORINE DIOXIDE

George A. Day, Berlin, and Edward F. Fenn, Gorham, N. H., assignors, by mesne assignments, to Brown Company, Portland, Maine, a corporation of Maine Application January 4, 1946, Serial No. 639,082

17 Claims. (Cl. 23—152)

This invention relates to the production of chlorine dioxide, and more particularly to an improved process for producing chlorine dioxide continuously and rapidly with high yields.

Chlorine dioxide has been prepared by treating chlorates with sulfuric acid or with mixtures of sulfuric acid and an organic reducing agent such as oxalic acid. These processes are, in general, uneconomical, hazardous and wasteful.

It is also well known that hydrochloric acid and chloric acid may be reacted to produce gaseous mixtures of chlorine dioxide and chlorine. In practice these reactions are carried out by treating aqueous mixtures of water-soluble chlorates and chlorides, such as may be obtained for example by chlorinating lime or by the electrolysis of salt, with an excess of a strong inorganic acid, such as hydrochloric acid or sulfuric acid. The following equations represent these reactions:

(1) $2NaClO_3 + 4HCl = 2ClO_2 + Cl_2 + 2NaCl + 2H_2O$ (2) $2NaClO_3 + 12HCl = 6Cl_2 + 2NaCl + 6H_2O$

Ordinarily reaction (2) is predominant over reaction (1) and the yield in chlorine dioxide is correspondingly low.

To minimize reaction (2) it has been suggested to react properly proportioned mixtures of chlorates, chlorides and a strong inorganic acid in dilute solutions (containing at least 50% and preferably up to 75% of water) at temperatures below 60° C. Based on reaction (1), equivalent ratios of $Cl^-/ClO_3^- = 2$ and of $H^+/ClO_3^- = 2$ should give high yields of $ClO_2$ per mol of chlorate decomposed. But in practice it has been proposed in particular to use a ratio of $H^+/ClO_3^-$ in excess of 2 because reaction (2) uses some of the chlorate in production of chlorine instead of $ClO_2$. This proposal results in the use of excessive quantities of acid.

Furthermore, it has been recognized that a high yield of $ClO_2$ per mol of chlorate decomposed, while desirable, is not alone sufficient to make the process economical for large scale production of chlorine dioxide. As a matter of practical necessity, it has therefore been recommended that the decomposition of the chlorate initially present be carried substantially to completion to avoid any appreciable waste of this valuable raw material. However, the requirement of consuming all, or almost all, of the chlorate entails inherent difficulties which greatly decrease the efficiency, rapidity and therefore the economy of the older process. One difficulty is the fact that the average hourly output of $ClO_2$ is necessarily low because the reaction rate decreases considerably as the concentration of the reactants, particularly of chlorate, decreases. The use of solutions of low chlorate content further magnifies this effect and wastes valuable space in the reaction chamber. Finally, as the concentration of chlorate decreases, reaction (2) contributes increasingly to the decomposition of the chlorate whereby the overall yield of chlorine dioxide is lowered.

It is an object of the present invention to provide an improved process capable of producing high yields of chlorine dioxide rapidly and efficiently. Another object of the invention is to decompose practically all of the chlorate supplied while maintaining a rapid rate of production of chlorine dioxide. Still other objects are to provide a continuous process with solutions rich in chlorate and with low relative amounts of acid, and to attain increased efficiency without waste of materials.

In general, our invention involves reacting solutions of chlorates with hydrochloric acid, the acid being supplied in amount substantially less than the equivalent stoichiometric ratio of $H^+/ClO_3^- = 2$ of reaction (1), thereby decomposing at any one time only a fraction of the available chlorate, said decomposition thus proceeding at a particularly rapid rate; enriching the chlorate content of the partially spent solution, as for example by feeding it to an electrolytic chlorate cell; returning the fortified solution to the reaction chamber to treat it again with a stoichiometrically insufficient amount of acid; and repeating this cycle, whereby substantially all the chlorate supplied is eventually efficiently decomposed, producing mixtures of chlorine dioxide and chlorine containing high proportions of chlorine dioxide.

While our invention is not limited to any particular solution containing chlorates and chlorides, we prefer to use concentrated solutions rich in chlorate. It is easily possible to prepare electrolytic chlorate cell liquors containing over 40% by weight of salts, and mol ratios of sodium chlorate to sodium chloride of the order of 4 to 1. By using such solutions rich in chlorate, we make available for decomposition at any one time large amounts of chlorate without undue waste of space in the reaction chamber, and we increase the rate of reaction (1) which, like all chemical reactions, proceeds more rapidly with higher concentrations of the reactants.

We prefer to use hydrochloric acid to react with the chlorate because the chloride ion takes part in the reaction and therefore is spent without appreciably contaminating the partially depleted solution which is returned to the chlorate cell. When the preferred electrolytic chlorate cell is used in conjunction with our invention, traces of hydrochloric acid in the partially spent solution which is returned to the chlorate cell actually favor the electrolytic production of chlorate.

While we may use aqueous hydrochloric acid, we prefer to use gaseous hydrogen chloride. By the use of gaseous hydrogen chloride, we avoid the progressive dilution of the recycled chlorate solution, which dilution would decrease the reaction rate or would necessitate an added operation of evaporation to retain an efficient output per unit of time and per unit of equipment.

Our invention generally utilizes mol ratios of hydrogen ion to initial chlorate ion substantially below the stoichiometric ratio of reaction (1). In practice we prefer to use gaseous hydrogen chloride in amount providing an equivalent molar ratio of acid to initial chlorate of one or less. The small amount of acid thus provided reacts with part only (not more than half) of the available chlorate, forming a gaseous mixture of $ClO_2$ and $Cl_2$ substantially according to reaction (1), reaction (2) being effectively minimized. In this manner a high reaction rate is always maintained, since the concentration of chlorate is high at any given time.

We have found it convenient to introduce the gaseous hydrogen chloride into the reaction chamber in a current of air which also serves to sweep the chlorine dioxide-chlorine mixture from the reaction vessel.

The accompanying flow sheet illustrates schematically one way in which our preferred process may be carried out. The strong sodium chlorate-sodium chloride cell liquor produced in the electrolytic cell 1 is fed to the reaction chamber 2 and reacted therein with HCl supplied to the chlorate liquor in gaseous form in a current of air which sweeps the gaseous hydrogen chloride from the hydrogen chloride vaporizer 3 into the reaction chamber 2. The same current of air carries the $ClO_2$–$Cl_2$ mixture, as it is formed, from the reaction chamber 2 to the gas separator 4. When the hydrochloric acid is substantially reacted, the partially spent chlorate liquor containing traces of HCl is returned to the electrolytic chlorate cell where the chlorate content is raised to substantially its initial value. This cycle may be repeated continuously. It is readily apparent that in this manner the chlorate produced is eventually almost completely decomposed into $ClO_2$ and $Cl_2$, according to reaction (1), at a remarkably fast rate and with no waste of acid.

The following description illustrates a typical experimental procedure which we have used to determine efficiencies as a function of reaction times.

200 cc. of chlorate liquor containing 500 grams per liter of sodium chlorate and 75 grams per liter of sodium chloride were placed in a reaction flask. This flask was put in a train where it was preceded by a flask containing a solution of 35% HCl. Attached to the other side of the reaction flask was a series of absorption flasks containing neutral normal potassium iodide. Air was drawn through the train at the rate of one liter per minute. The air drew HCl vapor into the reaction flask. A Y tube permitted regulation of the amounts of HCl admitted to the reaction flask. The chlorate liquor in the reaction flask was first heated to 40–50° C. The reaction started within two minutes, producing $ClO_2$ and $Cl_2$ which were carried into the absorption flasks by the current of air. The heat of reaction caused the temperature to increase at the start to about 65° C. where it was held constant by application of sufficient heat. The amounts of $ClO_2$ and $Cl_2$ evolved were determined by differential titration of the neutral and subsequently acidulated potassium iodide with standard thiosulfate solution (see White, Taylor and Vincent, Chemistry of Chlorites, Ind. Eng. Chem., p. 784, July 1942). The chlorate and chloride contents of the solution before and after the reaction were determined using the method described in Sutton's Handbook of Volumetric Analysis, p. 187 (Blakiston, Philadelphia, 1924). The HCl solution was titrated with standard alkali before and after aeration and the residual HCl in the reaction flask was also determined.

Using essentially this procedure and defining 100% efficiency as corresponding to a mol ratio of $ClO_2/Cl_2=2$ in the gas mixture, the following specific examples illustrate how our invention may be carried out.

*Example 1*

An electrolytic chlorate liquor containing 500 grams of sodium chlorate and 75 grams of sodium chloride per liter was fed to a reaction chamber and heated to 40–50° C. Gaseous HCl was added in a current of air, as described above, to a ratio of $H^+/ClO_3^-=9.60$. The reaction started within two minutes and was continued until 28% of the chlorate was consumed. The temperature in the reaction chamber was kept at 55–65° C. The chlorine dioxide-chlorine mixture evolved contained 59% of $ClO_2$ corresponding to an efficiency of 95%. The gas mixture was passed through a gas separator.

The partially spent chlorate liquor was fed from the reaction chamber to an electrolytic chlorate cell where the chlorate content was increased to its original strength. The enriched liquor was then returned to the reaction chamber and was again reacted with gaseous HCl as described above.

The cycle was repeated continuously, so that from then on all the chlorate produced in the electrolytic cell was decomposed with an efficiency of 95%.

*Example 2*

An electrolytic chlorate liquor containing 500 grams of sodium chlorate and 75 grams of sodium chloride per liter was fed to a reaction chamber, heated to 40–50° C., and gaseous HCl was added in a current of air, as described above, at a ratio of $H^+/ClO_3^-=0.67$. The reaction started within two minutes and was continued until 30% of the chlorate was consumed. The temperature in the reaction chamber was kept at 55–65° C. The chlorine dioxide-chlorine mixture evolved contained 58% of $ClO_2$ corresponding to an efficiency of 94%. The gas mixture was passed through a gas separator.

The partially spent chlorate liquor was fed from the reaction chamber to an electrolytic chlorate cell where the chlorate content was increased to the original strength. The enriched liquor was then returned to the reaction chamber and was again reacted with gaseous HCl as described above.

The cycle was repeated continuously, so that from then on all the chlorate produced in the electrolytic cell was decomposed with an efficiency of 94%.

Example 3

An electrolytic chlorate liquor containing 500 grams of sodium chlorate and 75 grams of sodium chloride per liter was fed to a reaction chamber, and aqueous HCl (31.6%) was added at the ratio of $H^+/ClO_3^- = 0.78$. The reaction started within two minutes and was continued until 35% of the chlorate was consumed. The temperature of the reaction chamber was kept at approximately 28° C. The chlorine dioxide-chlorine mixture evolved contained 57% $ClO_2$, corresponding to an efficiency of 93%. The gas mixture was passed through a gas separator.

The chlorate concentration of the partially spent liquor was increased by evaporating some of the water and by subsequently feeding the liquor back to an electrolytic chlorate cell, where the chlorate content was increased to the original strength. The enriched liquor was then returned to the reaction chamber and was again reacted with aqueous HCl as described above.

The cycle was repeated continuously so that from then on all the chlorate produced in the electrolytic cell was decomposed with an efficiency of 93%.

Example 4

An electrolytic chlorate liquor containing 221 grams of sodium chlorate and 238 grams of sodium chloride per liter was fed to a reaction chamber and aqueous HCl (31.6%) was added at the ratio of $H^+/ClO_3^- = 0.53$. The reaction started within two minutes and was continued until 27% of the chlorate was consumed. The temperature in the reaction chamber was kept at 24–39° C. The chlorine dioxide-chlorine mixture evolved contained 66% of $ClO_2$ corresponding to practically 100% efficiency. The gas mixture was passed through a gas separator.

The chlorate content of the partially spent liquor was enriched by evaporating some of the water and by subsequently feeding the liquor back to an electrolytic chlorate cell where the chlorate content was increased to the original strength. The enriched liquor was then returned to the reaction chamber and was again reacted with aqueous HCl as described above.

The cycle was repeated continuously so that from then on all the chlorate produced in the electrolytic cell was decomposed with practically 100% efficiency.

Having thus described our invention, we wish it understood that it is not to be limited to the specific examples given by way of illustration, but only as required by the appended claims.

We claim:

1. In a process for the manufacture of chlorine dioxide, the steps which comprise reacting an aqueous solution of an inorganic chlorate with HCl in a reaction zone, passing the reacted chlorate solution from said reaction zone to an electrolytic cell, increasing the chlorate content of said solution in said cell, then returning the fortified solution to the reaction zone for further reaction with HCl.

2. The process of claim 1 in which the HCl is gaseous.

3. The process of claim 1 in which the equivalent molar ratio $H^+/ClO_3^-$ between the total amount of HCl and the total amount of chlorate entering the reaction zone at any given time does not exceed one, and wherein the chlorate is sodium chlorate.

4. The process of claim 1 in which the HCl is gaseous and the chlorate is sodium chlorate.

5. In a process for the manufacture of chlorine dioxide, the steps which comprise reacting an aqueous solution of an inorganic chlorate with HCl in a reaction zone, said HCl being supplied in amount sufficient to react with part only of the chlorate present, passing the partially reacted chlorate solution from said reaction zone to an electrolytic chlorate cell, increasing the chlorate content of said solution in said cell, then returning the fortified solution to the reaction zone for further reaction with HCl.

6. The process of claim 5 in which the equivalent molar ratio $H^+/ClO_3^-$ between the total amount of HCl and the total amount of chlorate entering the reaction zone at any given time does not exceed one.

7. The process of claim 5 in which the HCl is gaseous.

8. The process of claim 5 in which the chlorate is sodium chlorate.

9. The process of claim 5 in which the HCl is gaseous and the chlorate is sodium chlorate.

10. The process of claim 5, in which the HCl is gaseous, the chlorate is sodium chlorate and the equivalent molar ratio $H^+/ClO_3^-$ between the total amount of HCl and the total amount of chlorate entering the reaction zone at any given time does not exceed one.

11. In a process for the manufacture of chlorine dioxide, the steps which comprise reacting an aqueous solution of an inorganic chlorate with hydrochloric acid in a reaction zone, said acid being supplied in amount sufficient to react with part only of the chlorate present, passing the partially reacted chlorate solution from said reaction zone to an electrolytic chlorate cell, increasing the chlorate content of said solution in said cell, then returning the fortified solution to the reaction zone for further reaction with acid.

12. The process of claim 11 in which the chlorate is sodium chlorate.

13. The process of claim 2 in which the equivalent molar ration $H^+/ClO_3^-$ between the total amount of acid and the total amount of chlorate entering the reaction zone at any given time does not exceed one.

14. The process of claim 13 in which the chlorate is sodium chlorate.

15. A process for the manufacture of chlorine dioxide, which comprises supplying an aqueous solution of an inorganic chlorate to a reaction chamber, supplying to said reaction chamber gaseous hydrogen chloride, the hydrogen chloride being supplied to said chamber in amount insufficient to react with all of the chlorate present therein, reacting the resulting acid with the chlorate, removing gaseous chlorine dioxide and chlorine from said reaction chamber, passing partially reacted chlorate solution from said reaction chamber to an electrolytic chlorate cell to increase the chlorate content thereof and returning the fortified chlorate solution to the reaction chamber for further reaction with hydrogen chloride.

16. The process of claim 15 in which the ratio $H^+/ClO_3^-$ in the reaction chamber at any time does not exceed one.

17. The process for the manufacture of chlorine dioxide which comprises supplying an aqueous solution of an inorganic chlorate to a reaction chamber, passing a current of gas through said reaction chamber, said current serving to introduce into said chamber gaseous hydrogen chloride and to remove from said chamber gaseous products of the reaction taking place therein, the hydrogen chloride being introduced to the reaction zone in amount such that the ratio $H^+/ClO_3^-$ in the reaction zone at any one time does not exceed one, reacting hydrogen chlorate in said reaction chamber with part only of the chlorate in said aqueous solution, passing partially reacted chlorate solution from said reaction chamber to an electrolytic chlorate cell to increase the chlorate content of said solution and returning the fortified chlorate solution to the reaction chamber for further reaction with hydrogen chloride.

GEORGE A. DAY.
EDWARD F. FENN.

REFERENCES CITED

The following references are of record in the file of this patent:

UNITED STATES PATENTS

| Number | Name | Date |
|---|---|---|
| 2,280,938 | Vincent | Apr. 28, 1942 |
| 2,409,862 | Hutchinson | Oct. 22, 1946 |

Certificate of Correction

Patent No. 2,484,402                                                        October 11, 1949

GEORGE A. DAY ET AL.

It is hereby certified that errors appear in the printed specification of the above numbered patent requiring correction as follows:

Column 4, line 31, for "9.60" read *0.60*; column 6, line 43, for the claim reference numeral "2" read *11*; line 44, for the word "ration" read *ratio*; column 7, line 5, for "chlorate" read *chloride*;

and that the said Letters Patent should be read with these corrections therein that the same may conform to the record of the case in the Patent Office.

Signed and sealed this 14th day of February, A. D. 1950.

[SEAL]

THOMAS F. MURPHY,
                                                           *Assistant Commissioner of Patents.*